United States Patent Office 3,386,890
Patented June 4, 1968

3,386,890
PROCESS FOR PREPARING EQUILIN
Claude Vezina, Oka, Quebec, David J. Marshall, Hampstead, Quebec, and Romano Deghenghi, Montreal, Quebec, Canada, assignors to American Home Products Corporation, New York, N.Y., a corporation of Delaware
No Drawing. Filed July 12, 1965, Ser. No. 471,415
2 Claims. (Cl. 195—51)

ABSTRACT OF THE DISCLOSURE

There is disclosed a process for the preparation of equilin from 5(10),7-estradiene-3,17-dione; 3,17β-dihydroxy-5(10),7-estradiene; or 17β-hydroxy-5(10),7-estradien-3-one wherein the starting material is incubated with a viable culture of a microorganism of the genera Bacterium, Mycobacterium, Corynebacterium and Nocardia.

The present invention relates to a process for preparing equilin, a well-known and powerful naturally occurring estrogen. It is a particular advantage of our invention that equilin may be prepared in good yields from easily available starting materials.

More specifically, equilin is prepared according to the process of this invention by microbiological transformation of 5(10),7-estradiene-3,17-dione, described in the copending U.S. patent application of Dr. G. Kruger, Ser. No. 452,886, filed May 3, 1965 (now U.S. Patent No. 3,340,278, issued Sept. 5, 1967), or from 3,17β-dihydroxy-5(10),7-estradiene, or from 17β-hydroxy-5(10),7-estradien-3-one, both those latter compounds being described in U.S. Patent No. 2,930,805.

The above microbiological transformation may be effected with certain genera of bacteria such as Bacterium, Mycobacterium, Corynebacterium, or Nocardia, with Corynebacterium simplex ATCC 6946, Nocardia corallina ATCC 999, Bacterium cyclooxidans ATCC 12673, Nocardia restrictus ATCC 14887, Nocardia corallina ATCC 13259, Mycobacterium rhodochrus ATCC 4273, Nocardia canicruria ATCC 17896, and Nocardia erythropolis ATCC 17895 being the preferred microorganisms. In actual practice the above microbiological transformation is carried out by incubating one of the three 5(10),7-estradiene derivatives mentioned above as the substrate with viable, growing or domant, cultures of the microorganisms listed above, separating the bulk of the bacterial culture from the beer by filtration or centrifugation, extracting the beer with a water-immiscible organic solvent, such as, for example, ethylene dichloride, evaporating the solvent, and purifying and isolating equilin by chromatography or crystallization or by a combination of those latter two methods.

The following formulae and examples will illustrate my invention.

Example I

Erlenmeyer flasks (250 ml. size), containing 50 ml. of a medium having a pH of about 6.5 (made up of a commercial glucose preparation, "Cerelose," 20 g., a protein hydrolysate, "Edamin," 20 g., corn steep liquor 5 g., distilled water 1000 ml.) are inoculated with Corynebacterium simplex ATCC 6946 and incubated at 25° C. for 42 hours. After reinoculation of the culture and further incubation for 24 hours, a sample of 25 mg. 5(10),7-estradiene-3,17-dione dissolved in acetone is charged into the culture to obtain a final concentration of 0.5 mg./ml., the mixture is incubated for 3–48 hours, samples are extracted with ethylene chloride, and the resulting extract evaporated to dryness under nitrogen. The dry extract is dissolved in chloroform-methanol 1:1 and equilin, identical with an authentic sample, is isolated by chromatography and crystallization.

In the same manner, by substituting 3,17β-dihydroxy-5(10),7-estradiene or 17β-hydroxy-5(10),7-estradien-3-one for 5(10),7-estradiene-3,17-dione and incubating with the same microorganism, and working up as above, equilin is also obtained.

Similarly, by substituing any of the following microorganisms, Nocardia corallina ATCC 999, Bacterium cyclooxidans ATCC 12673, Nocardia restrictus ATCC 14887, Nocardia corallina ATCC 13259, Mycobacterium rhodochrus ATCC 4273, Nocardia canicruria ATCC 17896, or Nocardia erythropolis ATCC 17895 for Corynebacterium simplex and incubating with any of the three 5(10),7-estradiene derivatives, 5(10),7-estradiene-3,17-dione, or 3,17β-dihydroxy-5(10),7-estradiene, or 17β-hydroxy-5(10),7-estradien-3-one, and working up as above, equilin is also obtained.

Example II

A culture of Corynebacterium simplex ATCC 6946 is incubated at 25° C. for 42 hours in the nutrient medium described in Example I. The culture is then centrifuged to remove nutrient medium, and resuspended in 0.03 molar phosphate buffer of pH 7.0. The resulting suspension of cells at pH 7.0 is charged with 1 mg. per ml. of 5(10),7-estradiene-3,17-dione dissolved in acetone. The mixture is incubated in 25° C. for 18–42 hours, extracted with ethylene chloride, and the extract chromatographed. Equilin is obtained and identified with an authentic sample.

In the same manner, by substituting 3,17β-dihydroxy-5(10),7-estradiene or 17β-hydroxy-5(10),7-estradien-3-one for 5(10),7-estradiene-3,17-dione and incubating with the same microorganism, and working up as above, equilin is also obtained.

Similarly, by substituting any of the following microorganisms, Nocardia corallina ATCC 999, Bacterium cyclooxidans ATCC 12673, Nocardia restrictus ATCC 14887, Nocardia corallina ATCC 13259, Mycobacterium rhodochrus ATCC 4273, Nocardia canicruria ATCC 17896, or Nocardia erythropolis ATCC 17895 for Corynebacterium simplex and incubating with any of the three 5(10),7 - estradiene derivatives, 5(10),7 - estradiene-3,17-dione, or 3,17β-dihydroxy-5(10),7-estradiene, or 17β-hydroxy-5(10),7-estradien-3-one, and working up as above, equilin is also obtained.

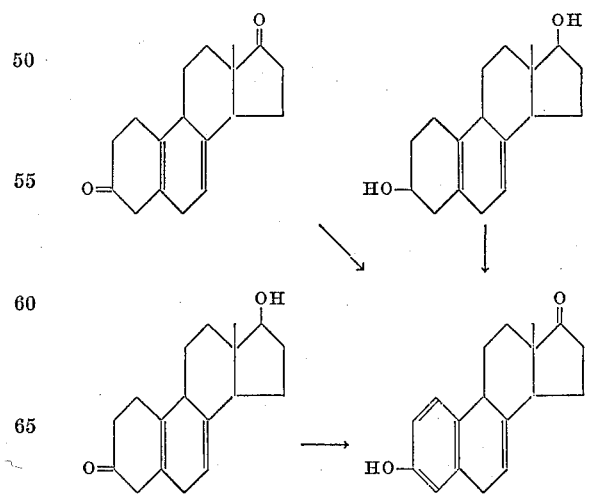

We claim:
1. The process of preparing equilin which comprises subjecting a starting material selected from the group which consists of 5(10),7-estradiene-3,17-dione; 3,17β- dihydroxy-5(10),7-estradiene; and 17β-hydroxy-5(10),7-estradien-3-one as the substrate to microbiological transformation by incubating the starting material with a viable culture of *Bacterium cyclooxidans;* and recovering equilin from the incubation medium.

2. The process of preparing equilin as defined in claim 1 wherein the microorganism is *Bacterium cyclooxidans* ATCC 12673.

References Cited

UNITED STATES PATENTS

| 2,930,805 | 3/1960 | Marshall | 260—397.4 |
| 3,067,212 | 12/1962 | Bowers et al. | 195—51 |
| 3,272,847 | 9/1966 | Irvine et al. | 195—51 |

ALVIN E. TANENHOLTZ, *Primary Examiner.*